J. LUNDGREN.
Steam Cooking Apparatus.
No. 143,171.          Patented September 23, 1873.
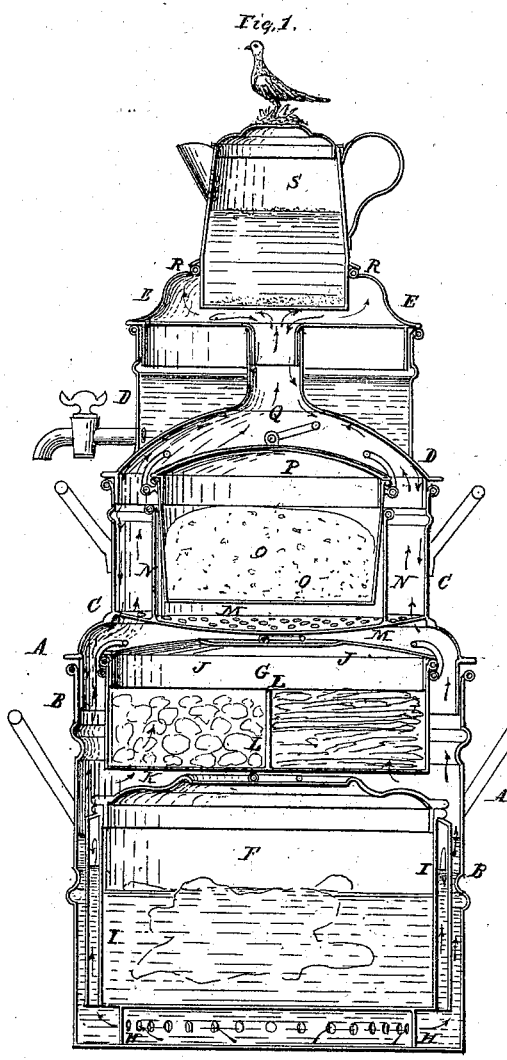
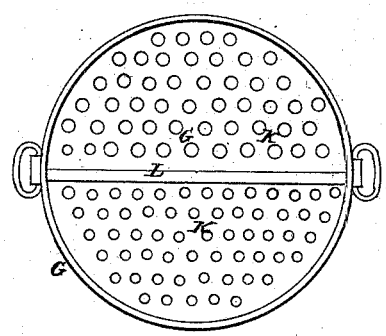
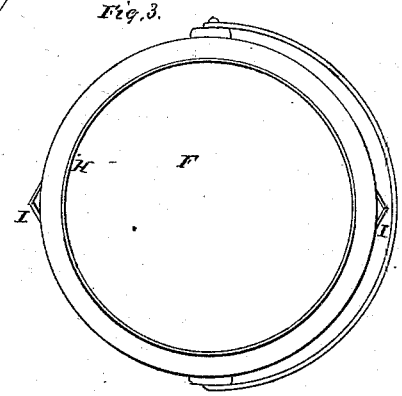
Witnesses.
Robat Wetzlich,
Fred. Schneider
Inventor.
John Lundgren

UNITED STATES PATENT OFFICE.

JOHN LUNDGREN, OF NEW YORK, N. Y., ASSIGNOR TO JONAH R. COLE, OF SAME PLACE.

IMPROVEMENT IN STEAM COOKING APPARATUS.

Specification forming part of Letters Patent No. 143,171, dated September 23, 1873; application filed June 23, 1873.

*To all whom it may concern:*

Be it known that I, JOHN LUNDGREN, of the city, county, and State of New York, have invented certain Improvements in Steam Cooking Apparatus, of which the following is a specification:

This invention relates to a steam cooking apparatus; and consists in having a water-chamber with concave bottom forming a tube, which leads to a condensing-chamber above, and the water-chamber located above the cooking-vessels, as hereinafter more fully described and pointed out in the claim.

In the annexed drawings, Figure 1 represents a central vertical section of the apparatus constructed with the improvements. Fig. 2 is a detached top view of the steaming-vessel. Fig. 3 is an inverted plan of the boiling-vessel used.

A represents the body of the apparatus, which is constructed of a lower body part, B, and three successively smaller bodies or additions, C, D, and E, each one having a rim to fit ready into the top of the one below it, so that they may be put together or lifted off readily by means of handles, with which they are provided on their outside, as shown. The lower body part B is a plain cylindrical vessel. It contains a boiling-vessel, F, and a steaming-vessel, G, of which the boiling-vessel rests upon the bottom of the apparatus. It serves for boiling meat and other food, and has a cover with a raised portion, upon which the steaming-vessel G is supported. The boiling-vessel has a rim, H, on its bottom, which is perforated, as shown, and it has two or more vertical steam-tubes on its outside (shown at I I) to circulate the steam from under the bottom of the vessel and encourage the boiling in the same. The steaming-vessel G has a proper tight cover, J, and a perforated bottom, K, to admit and hold the steam therein, and perform the steaming of the victuals therein. It has a central vertical partition, L, to cook two different kinds of vegetables at the same time, such as potatoes and cabbage, frequently required together. Both vessels are provided with proper handles on their upper part, and covers for handling the same. A portion of the perforated bottom of the vessel G is covered by the cover of the vessel F, so that the steam from the water in the apparatus enters only through about three-quarters of the area of the bottom of the vessel G. The addition C has a perforated bottom, M, and has a vertical cylindrical partition, N, into the top of which is fitted the baking pan or pot O for baking pudding and like eatables; and said pot is provided with a suitable cover, P, and with handles on it and on its upper part to handle the same. Upon the top of the addition C is fitted the addition D, which has concave bottom, as shown, with a central tube, Q, upward through the addition, leading into the addition E above it, which has a bottom covering the addition D, and has in its top an opening, R, for setting the coffee-pot therein. The addition D is filled with water, which is heated therein for making tea and other purposes, and has a small cock for drawing the water from it.

When the apparatus is used the lower body part B is supplied with water, which, when heated, generates the steam at its bottom, and the steam passes, as shown by the arrows in Fig. 1, through the perforations in the rim H upon the sides of the vessel F, and also into the tubes at I, and over the cover through the bottom of the vessel G, and also along the outside of said vessel, through the perforated bottom of the addition C, to the pot O, and also between the partition N and outside shell of said addition, and, finally, along the concave bottom of the body D, through the central passage or tube Q, into the body E under the coffee-pot S. In meeting the concave bottom and tube Q and shell of the body E, the steam becomes a great deal condensed, and the water from it leads back down to the lower body B, and feeds and supplies the same to a large extent.

What I claim as my invention, and desire to secure by Letters Patent, is—

The water-chamber D, having concave bottom, forming tube Q, interposed between the condensing-chamber E, having pot S, and the parts B C, substantially as shown and described.

JOHN LUNDGREN.

Witnesses:
ROBERT WETZLICH,
FRED. SCHNEIDER.